(12) United States Patent
Pilant et al.

(10) Patent No.: US 7,904,717 B2
(45) Date of Patent: Mar. 8, 2011

(54) METHOD, APPARATUS, AND MANUFACTURE FOR DECRYPTION OF NETWORK TRAFFIC IN A SECURE SESSION

(75) Inventors: L. Mark Pilant, Litchfield, NH (US); Mark C. Terranova, Maynard, MA (US); Ronald J. Karr, North Chelmsford, MA (US)

(73) Assignee: Oracle America, Inc., Redwood City, CA (US)

( * ) Notice: Subject to any disclaimer, the term of this patent is extended or adjusted under 35 U.S.C. 154(b) by 914 days.

(21) Appl. No.: 11/765,427

(22) Filed: Jun. 19, 2007

(65) Prior Publication Data

US 2008/0320302 A1 Dec. 25, 2008

(51) Int. Cl.
*H04L 9/32* (2006.01)
*H04L 29/06* (2006.01)
*G06F 12/14* (2006.01)
*H04L 9/00* (2006.01)

(52) U.S. Cl. .......... 713/171; 713/163; 713/193; 380/44; 380/259; 380/277

(58) Field of Classification Search .................. None
See application file for complete search history.

(56) References Cited

U.S. PATENT DOCUMENTS

| | | | |
|---|---|---|---|
| 7,668,313 B2 * | 2/2010 | Nave | 380/259 |
| 2002/0104001 A1 * | 8/2002 | Lotspiech et al. | 713/163 |
| 2007/0006291 A1 * | 1/2007 | Barari et al. | 726/10 |
| 2007/0058807 A1 * | 3/2007 | Marsh | 380/44 |

OTHER PUBLICATIONS

"CAE Specification—DCE 1.1: Remote Procedure Call", The Open Group, Oct. 1997, 748 pgs.
Krawczyk, H. et al., "HMAC: Keyed-Hashing for Message Authentication", RFC 2104, Network Working Group, Feb. 1997, 11 pgs.
Baize, E. et al., "The Simple and Protected GSS-API Negotiation Mechanism", RFC 2478, Network Working Group, Dec. 1998, 17 pgs.
Neuman, C. et al., "The Kerberos Network Authentication Services (V5)", RFC 4120, Network Working Group, Jul. 2005, 139 pgs.
"Common Internet File System (CIFS) Technical Reference Revision 1.0", SNIA Technical Proposal, SNIA CFS Technical Work Group, Feb. 27, 2002, http://www.snia.org/tech_activities/CIFS, 150 pgs.
Howes, T. et al., "The LDAP Application Program Interface", RFC 1823, Network Working Group, Aug. 1995, 21 pgs.
Leach, Paul J. et al., "A Common Internet File System (CIFS/1.0) Protocol—Preliminary Draft", Dec. 19, 1997, 116 pgs.
"SAMBA: Opening Windows to a Wider World", samba.org, 5 pgs.
"Wireshark: Sniff Free or Die", wireshark.org, 2 pgs.
"Etheral: Powerful Multi-platform Analysis", etheral.org, 1 pg.

\* cited by examiner

*Primary Examiner* — Shin-Hon Chen
(74) *Attorney, Agent, or Firm* — Osha • Liang LLP

(57) ABSTRACT

A network trace utility is provided. The network trace utility receives and copies packets in a secure session of (at least) two-way network communication between a client and a server. The network trace utility receives an administrator password, and uses a hash of the administrator password to decrypt the first session key. The network trace utility then decrypts one or more additional session keys, each one using the preceding session key. Then, the network trace utility decrypts the machine key using one of the session keys. A hash of the machine key is used to decrypt additional packets in the secure session. The network trace utility enables the contents of one or more additional packets in the secure session to be displayed to the user.

18 Claims, 8 Drawing Sheets

METHOD, APPARATUS, AND MANUFACTURE FOR DECRYPTION OF NETWORK TRAFFIC IN A SECURE SESSION

FIELD OF THE INVENTION

The invention is related to network communications, and in particular but not exclusively, to a method, apparatus, and manufacture for decrypting data passed between systems in a secure session.

BACKGROUND OF THE INVENTION

A network trace utility may be used to capture network packets of data and display the contents of the packets. This information may then be used to troubleshoot network problems, such as network connectivity problems, or the like. Network trace utilities are also known as protocol analyzers, network analyzer, or packet sniffers. Existing protocol analyzers include, inter alia, Wireshark, Ethereal, tcpdump, and Netmon protocol analyzers.

However, at present, no known protocol analyzer in the background art is capable of decrypting data passed between Windows® operating system based systems in an encrypted Windows® operating system domain RPC (remote procedure call) session, despite attempts to do. Therefore, users of known existing network analyzers cannot view such RPC data. It might be possible for an existing network analyzer to decrypt packet data if the corresponding session key is provided in a keytab file, but this would require the user to manually obtain and derive the keys, which is very difficult.

DETAILED DESCRIPTION

Figure 1:
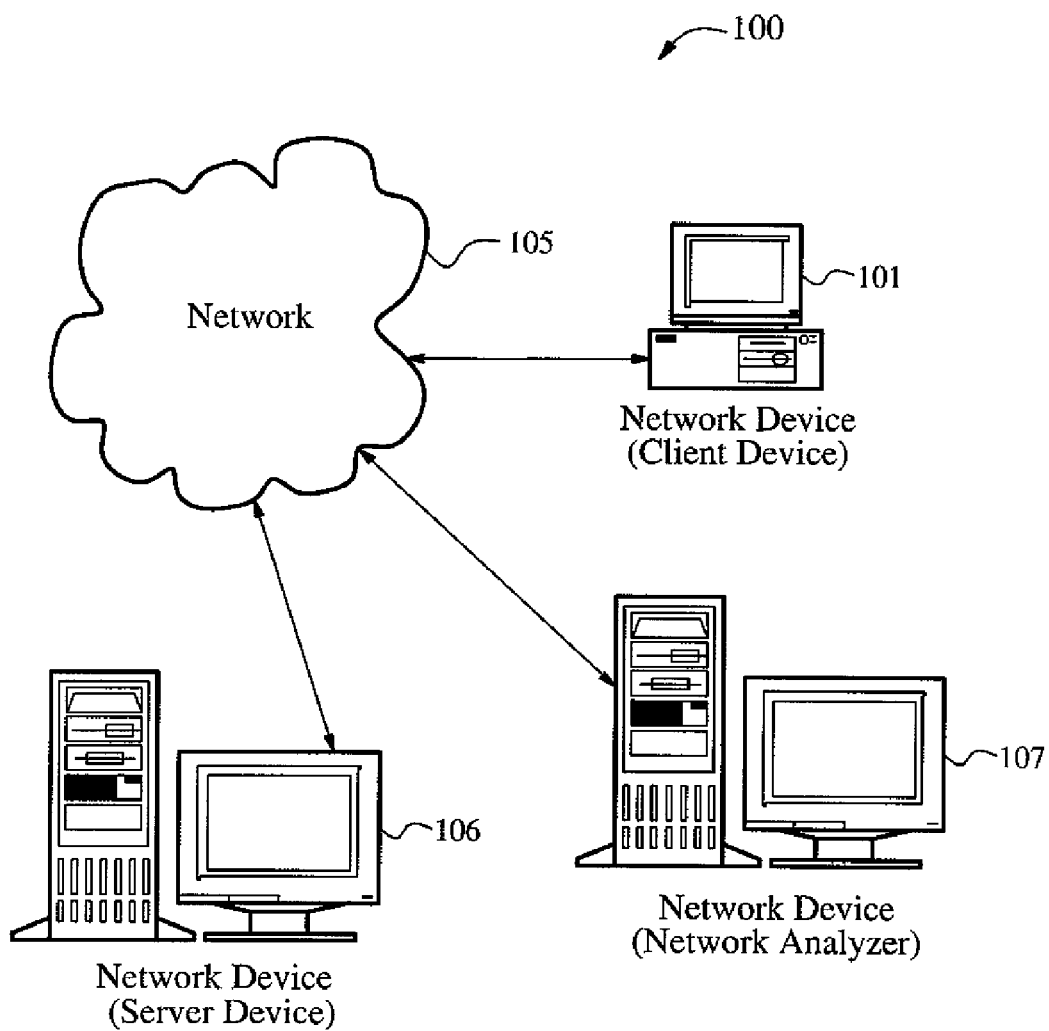
FIG. 1 shows a block diagram of an embodiment of a system for communicating over a network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise.

The term "network connection" refers to a collection of links and/or software elements that enable a computing device to communicate with another computing device over a network. One example of such a network connection might be a TCP connection. TCP connections are logical connections between two network nodes, and are typically established through a TCP handshake protocol. The TCP protocol is described in more detail in Request for Comments (RFC) 793, which is available through the Internet Engineering Task Force (IETF). A network connection "over" a particular path or link refers to a network connection that employs the specified path or link to establish and/or maintain a communication.

Briefly stated, the invention is related to a network trace utility that receives and copies packets in a secure session of (at least) two-way network communication between a client and a server. The network trace utility receives an administrator password, and uses a hash of the administrator password to decrypt the first session key. The network trace utility then decrypts one or more additional session keys, each one using the preceding session key. Then, the network trace utility decrypts the machine key using one of the session keys. Session keys decrypted by an MD4 (Message Digest 4) hash of the machine key are used to decrypt additional packets in the secure session. The network trace utility enables the contents of one or more additional packets in the secure session to be displayed to the user.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes network 105, server device 106, client device 101, and Network Analyzer 107.

Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. The set of such devices might also include devices that typically connect using a wireless communications medium such as cell phones, smart phones, radio frequency (RF) devices, infrared (IR) devices, integrated devices combining one or more of the preceding devices, or virtually any mobile device. Similarly, client device 101 might be any device that is capable of connecting using a wired or wireless communication medium such as a PDA, POCKET PC, wearable computer, or any other device that is equipped to communicate over a wired and/or wireless communication medium.

Client device 101 might communicate with network 105 employing a variety of network interfaces and associated communication protocols. Client device 101 might, for example, use various dial-up mechanisms with a Serial Line IP (SLIP) protocol, Point-to-Point Protocol (PPP), any of a variety of Local Area Networks (LAN) including Ethernet, AppleTalk™, WiFi, Airport™, or the like.

Network 105 is configured to couple server device 106 and its components with other computing devices, including client device 101. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 might further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client device 101 with various degrees of mobility. For example, the wireless network may enable a radio connection through a radio network access such as Global System for Mobil communication (GSM), General Packet Radio Services (GPRS), Enhanced Data GSM Environment (EDGE), Wideband Code Division Multiple Access (WCDMA), and the like Furthermore, remote computers and other related electronic devices could be remotely connected to either LANs or WANs via a modem and temporary telephone link. In essence, network 105 includes any communication method by which information may travel between server device 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "propagated signal", "modulated data signal", and "carrier-wave signal" each include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Client device 101 and server device 106 are capable of creating at least one type of secure, encrypted session of communication between client device 101 and server device 106 over network 105 that involves the exchange of encrypted keys. During a secure session, server device 106 generates and provides encrypted session keys to client device 101, and client device 101 generates and provides an encrypted machine key or machine password to server device 106.

Network analyzer 107 is a network device that is configured to make copies of packets that travel to and from client device 101 and server device 106. Also, network analyzer 107 provides contents of the packets to a user of network analyzer 107. Network analyzer 107 may decode the contents of the packet based on the protocol(s) used by the packet and provide this information to the user of network analyzer 107. Further, network analyzer 107 is capable of decrypting packets communicated between client device 101 and server device 106 for at least one type of secure session. Network analyzer 107 prompts its user for the administrator password. If a secure session is detected, network analyzer 107 uses the administrator password to decrypt a first key of the session, and this key is used to in turn decrypt other keys for the secure session. Decrypting packets in the secure session requires knowledge of the domain administrator password, which means that it may not be used by anyone other than a privileged administrator.

Although FIG. 1 illustrates two-way communication between a client and server that is captured by network analyzer 107, in other embodiments three-way or greater communication may be employed between three or more members of a secure session which is captured by network analyzer 107.

Illustrative Network Device

Figure 2:
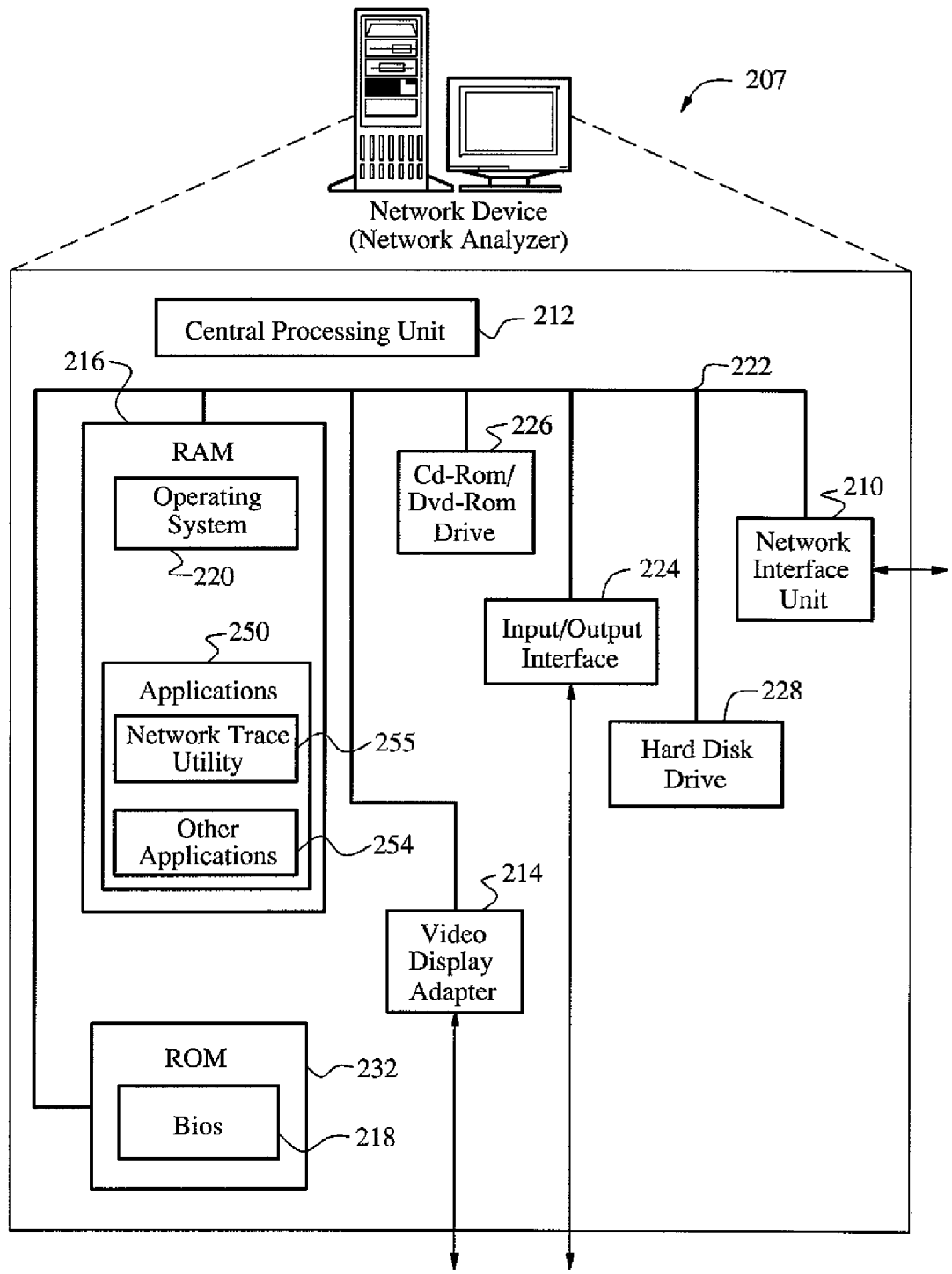
FIG. 2 illustrates one embodiment of a network device that may be included in a system implementing an embodiment of the invention.

FIG. 2 shows one embodiment of network analyzer 207, which may be employed as an embodiment of network analyzer 107 of FIG. 1. Network analyzer 207 may include many more components than those shown. The components shown, however, are sufficient to disclose an illustrative embodiment for practicing the invention.

Network analyzer 207 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network analyzer 207. Any general-purpose operating system may be employed. Basic input/output system ("BIOS") 218 is also provided for controlling the low-level operation of network analyzer 207. As illustrated in FIG. 2, network analyzer 207 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC). The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Applications 250 include network trace utility 255 and other applications 254. Network interface 210 is arranged to receive packets sent from client device 101 to server device 106, and from server device 106 to client device 101. Network trace utility 255 causes the packets to be copied to memory. Also, network trace utility 255 enables the contents of the packet to be displayed to the user. In some embodiments, network trace utility 255 decodes the data in the packets based on the protocol(s) used by the packet, and enables the display the information in the packet in a meaningful way to the user, for troubleshooting or other purposes. Network trace utility 255 can also provide data from at least one type of encrypted secure session, but only if the administrator password is provided.

Network trace utility 255 is capable of decrypting at least one type of encrypted secure session. In one embodiment, network trace utility 255 is capable of decrypting encrypted Windows® operating system domain RPC communications. Network trace utility 255 queries the user for the administrator password. If a secure session is initiated, the administrator password is used to decrypt the first key needed in the decryption process. In one embodiment, network trace utility 255, in conjunction with other component of network analyzer 207, performs process 302 FIG. 3.

Writing the code for network trace utility 255 may require an understanding of the protocols used by the packets. In some cases aspects of the protocols are publicly known. In other cases, part or all of the protocol is reverse engineered in order to fully understand the protocols used, including possibly security aspects of the protocol(s).

Illustrative Operation

Figure 3:
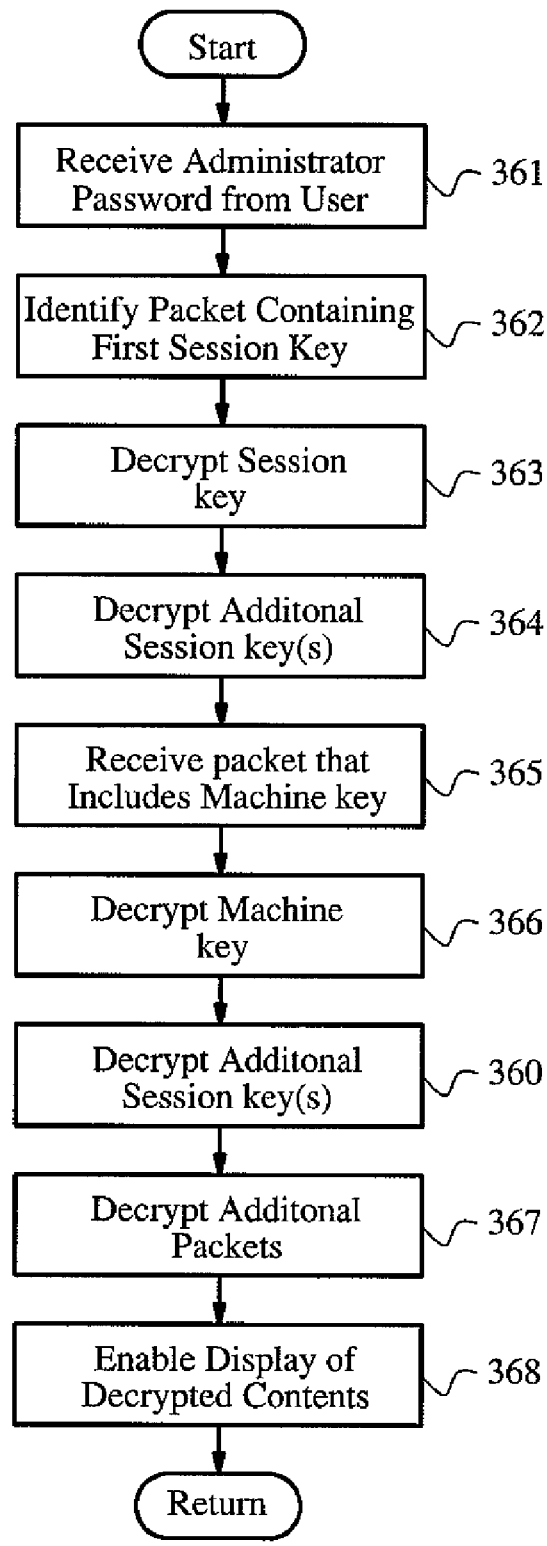
FIG. 3 shows a flowchart of an embodiment of a process.

FIG. 3 shows a flowchart of an embodiment of process 302. After a start block, the process moves to block 361, where an administrator password is received from a user. The process then advances to block 362, where a packet containing a first session key is identified. The process then proceeds to block 363, where the first session key is decrypted with the administrator password. In one embodiment, the session key is decrypted with an MD4 hash of the administrator password.

The process then moves to block 364, where one or more additional session keys are decrypted. Each of these session keys is decrypted using the preceding session key. The session keys are all included in packets sent from the server to the client. The process then advances to block 365, where a packet that includes the machine key is received. The packet that includes the machine key is sent from the client to the server.

The process then proceeds to block 366, where the machine key is decrypted using one of the session keys that was previously decrypted. The process then moves to block 360, where one or more additional session keys are decrypted using the machine key. In one embodiment, the one or more additional session keys are decrypted using a hash of the machine key.

The process then moves to block 367, where additional packets in the session are decrypted using one of the session key(s) that was previously decrypted at step 360. The process then advances to block 368, where the display of the decrypted contents of the packets is enabled. The process then proceeds to a return block, where other processing is resumed.

Figure 4:
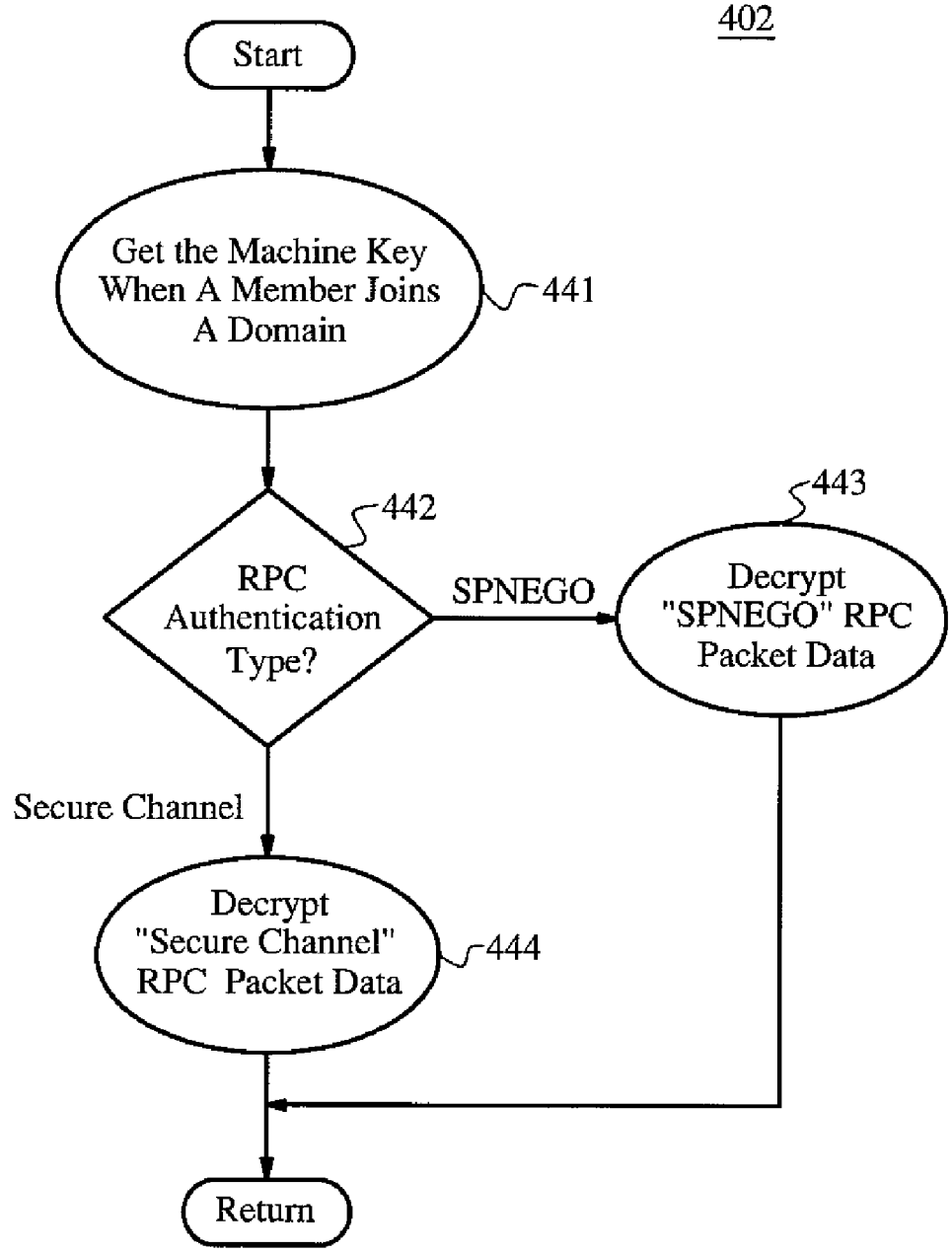
FIG. 4 shows a flowchart of an embodiment of another process.

Illustrative Operation for a Particular Embodiment that Decodes Encrypted Windows® Operating System Domain RPC Communications FIG. 4 shows a flowchart of an embodiment of process 402, which may be employed as an embodiment of process 302 of FIG. 3. Process 402 is an embodiment of process 302 that is used for decryption for an encrypted Windows® operating system domain RPC session.

After a start block, the process moves to block 441, where a decrypted machine key is obtained when a member joins the domain. The process then advances to decision block 442, where a determination is made as to what RPC authentication type is being used.

In one embodiment, the determination at decision block 442 is made as follows. The RPC "Bind_ack" packet contains an "auth_verifier_co_t" structure, which is appended to the RPC header. This structure is detailed more fully in the document "CAE Specification—DCE 1.1: Remote Procedure Call", The Open Group, October 1997, which is incorporated by reference herein. This document is available from The Open Group at The Open Group, Apex Plaza, Forbury Road, Reading, Berkshire, RG1 1AX, United Kingdom. Information regarding the "auth_verifier_co_t" structure may be found specifically in the section "Common Authentication Verifier Encodings" of "CAE Specification—DCE 1.1: Remote Procedure Call". This structure contains an "auth_type" field which identifies the authentication mechanism. A value of 0x09 indicates the SPNEGO (Simple and Protected GSS-API [Generic Security Services Application Program Interface] Negotiation Mechanism) authentication type, and a value of 0x68 indicates the "Secure Channel" authentication type. Accordingly, the value in the "auth_type" field may be used to make the determination at decision block 442.

If, at decision block 442, it is determined that the RPC authentication type of the session is the "SPENGO" authentication type, the process moves to block 443, where the SPNEGO RPC packet data is decrypted. If the SPNEGO mechanism is specified (by a value of 0x09 in the auth_type field, as previously discussed), a SPNEGO token is appended after the "auth_verifier_co_t" structure. The structure of the SPNEGO token is described in RFC 2478, "The Simple and Protected GSS-API Negotiation Mechanism", E. Baize, D. Pinkas, December 1998, which is incorporated by reference herein. RFC 2478 is available through the Internet Engineering Task Force (IETF). The process then advances to a return block, where other process is resumed.

If, at decision block 442 it is determined that the RPC authentication type of the session is the "Secure Channel" authentication type, the process proceeds to block 444, where the "Secure Channel" RPC packet data is decrypted. The process then moves to the return block.

Process 400 may enable a network analyzer to decrypt secure session Windows® operating system domain network communications. This makes it possible to fix communication and networking problems and to build non-Windows® based systems that can interoperate with Windows®-based systems. Security is not compromised since the user must know the administrator password.

Examination of cryptographic network traffic also may be used to verify that the information present without encryption is functionally the same as the information present with encryption, to ensure that no information has been added, modified, or removed.

Figure 5A:
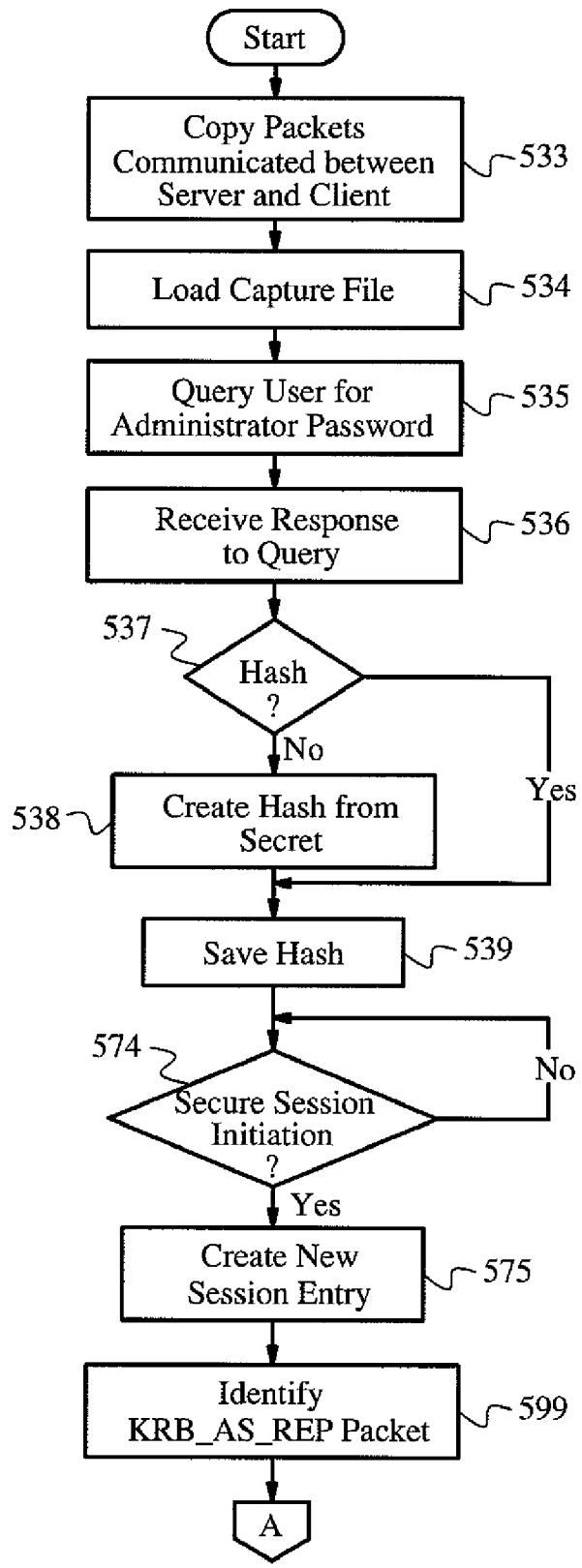
FIGS. 5A and 5B illustrate a flowchart of an embodiment of a process that may be employed as part of the process of FIG. 4.
Figure 5B:
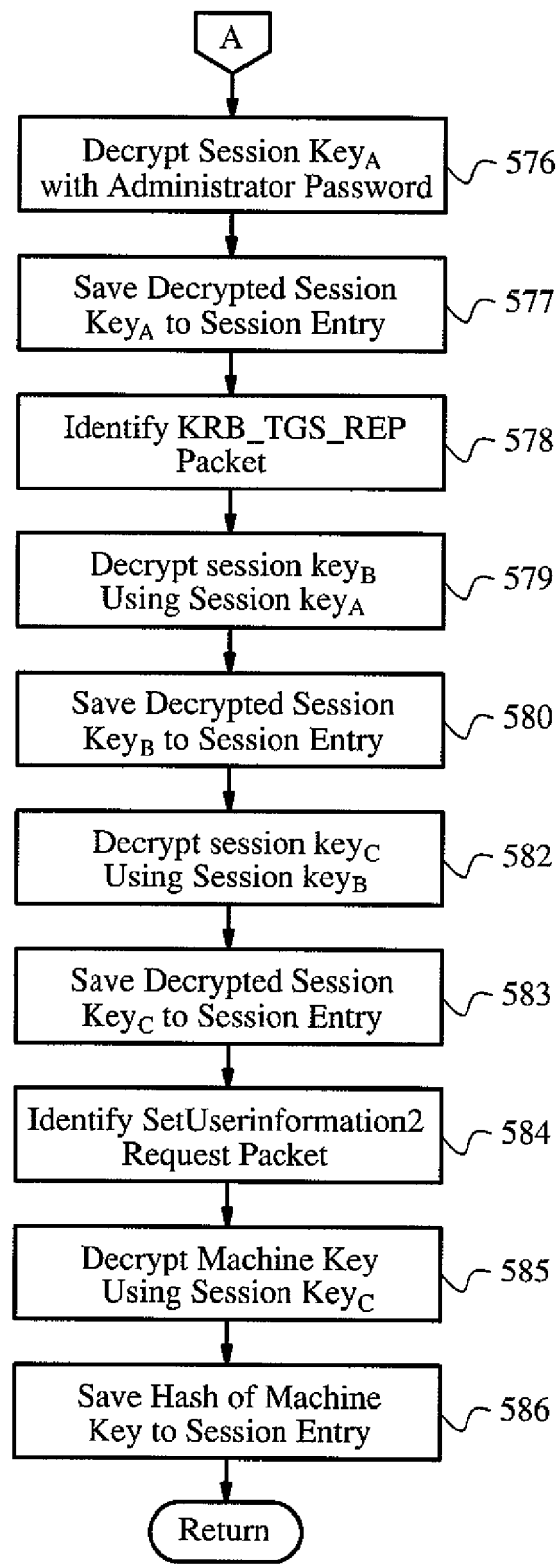

FIGS. 5A and 5B illustrate a flowchart of an embodiment of process 541, which may be employed as an embodiment of step 441 of process 402 of FIG. 4.

After a start block, the process proceeds to block 533, where packets sent from the client to the server, and from the server to the client, are copied and saved into a capture file. In one embodiment, monitoring the traffic between the various systems is initiated prior to booting up the target systems. The process then moves to block 534, where the capture file is loaded. The process proceeds to block 535, where the user of the network analyzer is queried for the administrator password of the secure Windows® operating system domain session. The process then moves to block 536, where the response to the query is received.

The process then advances to decision block 537, where a determination is made as to whether the response to the query is a hash. If the determination at decision block 537 is negative, the process proceeds to block 538, where a hash (e.g., an RC4 [Rivest Cipher 4] hash or an AES [Advanced Encryption Standard] hash) made from the secret. The process then proceeds to block 539, where the hash is saved.

The process then moves to decision block 574, where a determination is made as to whether the next packet is a Session Setup request packet. The Session Setup response packet is described in the "Common Internet File System (CIFS) Technical Reference Revision: 1.0 SNIA Technical Proposal", SNIA CIFS Technical Work Group, Feb. 27, 2002, which is incorporated by reference herein. "Common Internet File System (CIFS) Technical Reference Revision: 1.0 SNIA Technical Proposal" is available from Storage Networking Industry Association, 500 Sansome Street, Suite #504, San Francisco, Calif. 94111. The Session Setup response packet is identified by the value 0x73 in the Command field of the SMB Header as described in section 3.2.1 of "Common Internet File System (CIFS) Technical Reference Revision: 1.0 SNIA Technical Proposal". The Session Setup response packet is a packet that is encoded to initiate a session between the client and the server. At decision block 574, if the packet is determined to be a have the value 0x73 in a command field of an SMB header, then the determination as decision block 574 is positive. Otherwise, the determination is negative.

If the determination at decision block 574 is negative, the process loops back to block 574, where the same determination is made for the next packet in the capture file. However, if the determination is decision block 574 is positive, the process advances to block 575, where a new session entry is created. The new session entry is a data structure that is used by the network analyzer to store information related to the session.

The process then proceeds to block 599, where the KRB_AS_REP packet sent from the server to the client prior to the Session Setup request packet is identified (so it will be an earlier packet in the capture file then the Session Setup request packet). The KRB_AS_REP packet includes session key$_A$. The structure of the KRB_AS_REP packet is described in RFC 4120, "The Kerberos Network Authentication Service (V5)", C. Neuman, T. Yu, S. Hartman, K. Raeburn, July 2005, which is incorporated by reference herein. RFC 4120 is available through the Internet Engineering Task Force (IETF).

The process then moves to block 576, where session key$_A$ is decrypted using an MD4 hash of the administrator password. The session key is in the "key" field described in section 5.4.2 of RFC 4120, and may be decrypted with the administrator password hash using the algorithm indicated in the "etype" (Encryption Type) field, where the "etype" field is described in section 5.2.9 of RFC 4120.

The process then proceeds to block 577, where the decrypted session key$_A$ is saved to the session entry. The process then moves to block 578, where the KRB_TGS_REP packet (sent after the KRB_AS_REP packet and before the Session Setup request packet) is identified. The KRB_TGS_REP packet structure is described in RFC 4120. The process then moves to block 579, where session key$_B$ in the KRB_TGS_REP packet is decrypted using session key$_A$. The session key is in the "key" field described in section 5.4.2 of RFC 4120. Session key$_B$ is contained within the ticket for the "CIFS" (Common Internet File System) service. Session key$_B$ is decrypted using the same algorithm that was used to decrypt session key$_A$.

The process then proceeds to block 580, where the decrypted session key$_B$ is saved to the session entry. The process then moves to block 582, where session key$_C$ is decrypted using session key$_B$. Session key$_C$ is decrypted using the same algorithm that was used to decrypt session key$_B$. Session key$_C$ is in the "subkey" field of the KRB_AP_REP structure, where the KRB_AP_REP structure is embedded in the Session Setup response packet in the "Security-Blob" field described in section 4.1.2.2 of the CIFS SNIA reference. The "subkey" field is described in section 5.5.1 of RFC 4120.

The process then proceeds to block 583, where the decrypted session key$_C$ is saved to the session entry. The process then moves to block 584, where the SAM (Secure Access Module) RPC SetUserinformation2 request packet is identified. The format of the RPC packets is described in "CAE Specification—DCE 1.1: Remote Procedure Call". The "opnum" in the RPC packet that identifies the SetUserInformation2 request has the value 0x3a. The "opnum" is described in "CAE Specification—DCE 1.1: Remote Procedure Call" at the section "Generic PDU Structure, Header Encodings".

The process then advances to block 585, where the machine key (or machine password) is decrypted using session key$_C$. The data field of the SAM RPC SetUserInformation2 is immediately after the opnum, and the data field contains 532 bytes. The last 16 bytes of the data field are a confounder which is combined with the session key in an HMAC_MD5 (keyed-hash message authentication code_ message digest 5) hash to generate a decryption key. The HMAC_MD5 hash is described in more detail in RFC 2104 "HMAC: Keyed-Hashing for Message Authentication", H. Krawczyk, M. Bellare, R. Canetti. February 1997, which is incorporated by reference herein. RFC 2104 is available through the Internet Engineering Task Force (IETF). The decryption key is used to decrypt the first 516 bytes of the data using RC4. The last 4 bytes represent the length of the machine key. The machine key (or machine password) is found at the offset "512—length of the machine key" in the decrypted data buffer.

The process then moves to block 586, where an MD4 hash of the machine key for this domain member is saved in the session entry. The process then moves to a return block, where other processing is resumed.

At decision block 537, is the determination is positive, the process advances from decision block 537 to block 539.

The steps at blocks 585 and 586 described above may vary according to the type of Windows® operating system used by the client, as described below:

Windows NT®

A password is obtained, on the wire, from a SamrChangePasswordUser2 request. This password is then converted to Unicode, and an RC4-HMAC hash is created from the result.

Windows 2000® Operating System

Under the Windows 2000® operating system, there are a number of steps used to create the cryptographic hash. Following is pseudo-code describing the algorithm to compute the machine password hash.

```
N := frame byte count;
H_SS := sessionsetuprequest.key;
/* The length of the password payload is fixed at 516 bytes. */
data.length := 516;
data.crypto := frame[N - data.length:N];
/* Decrypt payload using session key */
data.clear := RC4(H_ss, data.crypto);
/* Last 4 bytes of clear buffer = password length */
password.length := data.clear[512:515];
password.data := data.clear[0:password.length];
H_m := MD4(password.data, password.length);
```

Windows XP® & 2003®

Under Windows XP® and 2003® operating systems, there are additions to the algorithm used for the Windows 2000® operating system. Following is pseudo-code describing the algorithm to compute the machine password hash.

```
N := frame byte count;
H_SS := sessionsetuprequest.key;
/* Last 16 bytes of the frame are the confounder */
confounder.length := 16;
confounder.data := frame[N – confounder.length:N];
H_temp := MD5(confounder.data, confounder.length, H_SS, 16);
/* The length of the password payload is fixed at 516 bytes. */
data.length := 516;
data.crypto := frame[N – (data.length + confounder.length):N];
data.clear := RC4(H_temp, data.crypto); /* Decrypt payload using temporary key */
password.length := data.clear[512:515]; /* Last 4 bytes of clear buffer = length */
password.data := data.clear[0:password.length];
H_M := MD4(password.data, password.length);
```

Windows Vista® & Longhorn Server® Operating Systems

The algorithm for Windows Vista® and Longhorn Server® operating systems prior to build 5219 use the algorithm described in above for Windows XP® & 2003® operating systems.

For build 5219 and above, the session setup request key is an AES256-CTS-HMAC -SHA1-96 hash. This has a length of 32 bytes; per the specification. However, when computing the temporary hash ($H_{temp}$) only the first 16 bytes of the AES hash are used. Otherwise, the algorithm is the same.

Figure 6:
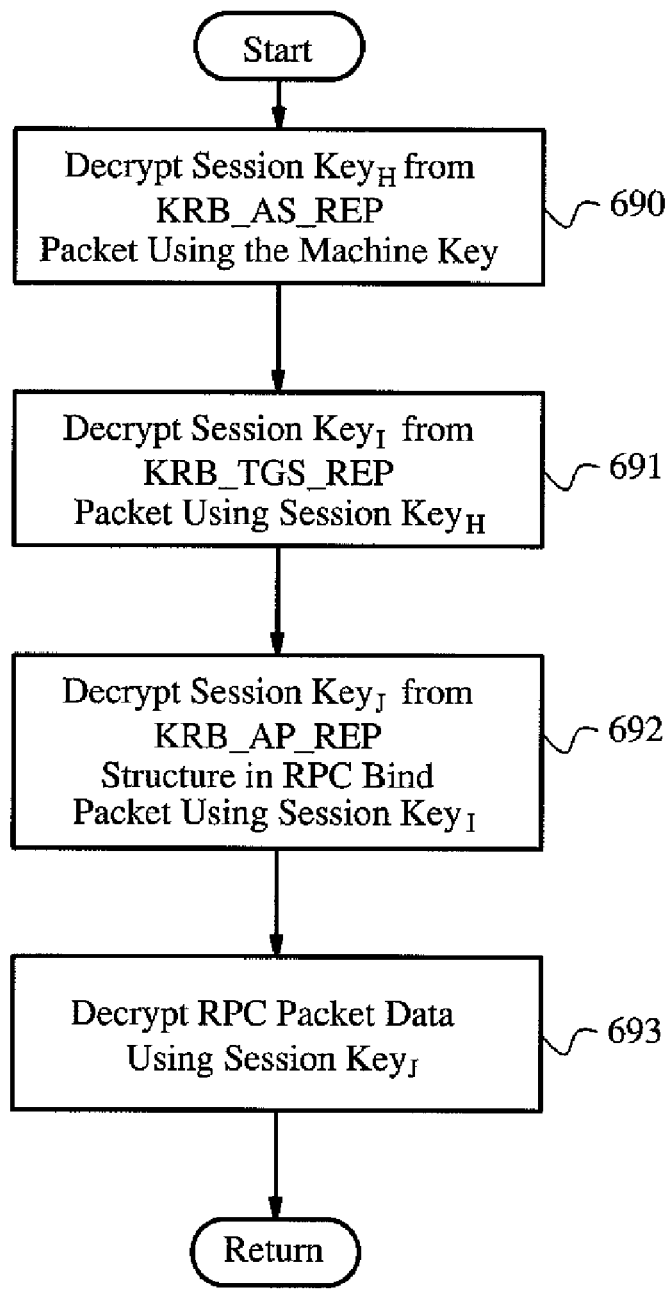
FIG. 6 illustrates a flowchart of an embodiment of a process that may be employed as another part of the process of FIG. 4.

FIG. 6 illustrates a flowchart of an embodiment of process 643, which may be employed as an embodiment of step 443 of process 402 of FIG. 4.

After a start block, the process moves to block 690, where session key$_H$ in a KRB_AS_REP packet is decrypted using the machine key. This is a later KRB_AS_REP packet than the one which contained session key$_A$. The process then advances to block 691, where session key$_T$ in the KRB_TG-S_REP packet is decrypted using session key$_H$. Session key$_T$ is contained within a ticket for the "LDAP" (Lightweight Directory Access Protocol) service. The LDAP protocol is described at RFC 1823, "The LDAP Application Program Interface", T. Howes, M. Smith, August 1995, which is incorporated by reference herein. RFC 1823 is available through the Internet Engineering Task Force (IETF).

The process then proceeds to block 692, where Session key$_J$ is decrypted using Session key$_T$. Session key$_J$ is the "subkey" in the KRB_AP_REP structure in the RPC Bind response packet.

The process then advances to block 693, where the data in the RPC packets passed back in forth in the secure Windows® operating system domain RPC session is decrypted using Session key$_J$ to do the decryption. The process then moves to a return block, where other processing is resumed.

Figure 7:
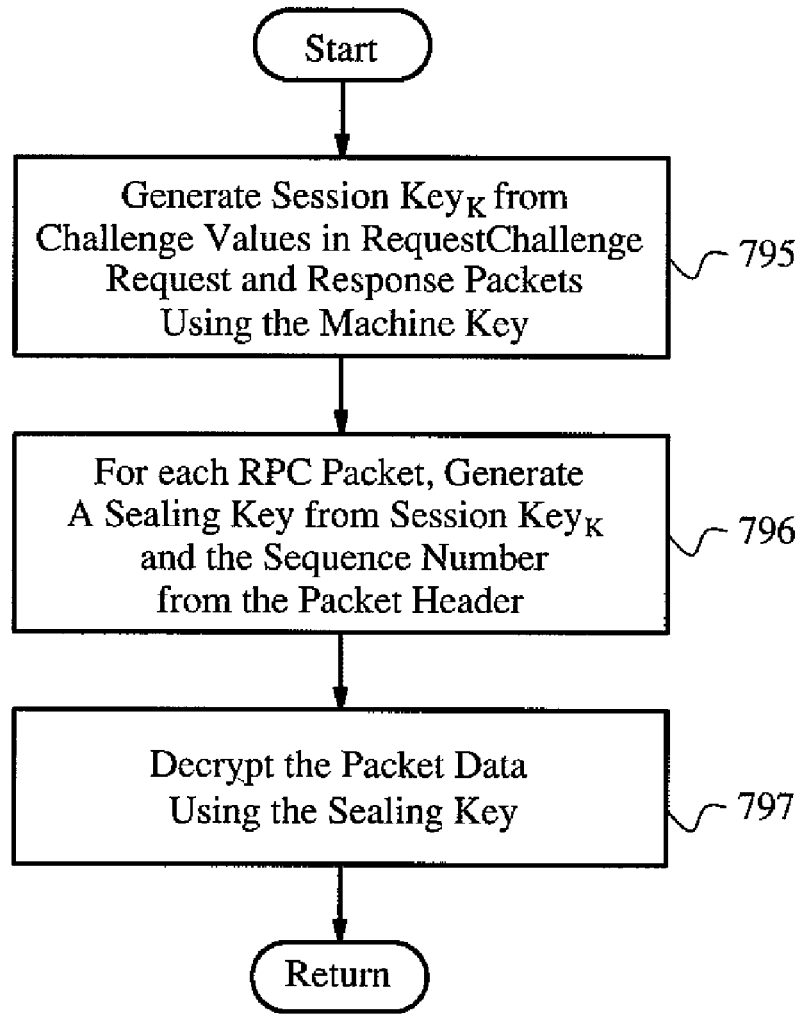
FIG. 7 illustrates a flowchart of an embodiment of a process that may be employed as yet another part of the process of FIG. 4, in accordance with aspects of the present invention.

FIG. 7 illustrates a flowchart of an embodiment of a process 744, which may be employed as an embodiment of step 444 of process 402 of FIG. 4.

After a start block, the process moves to block 795, where session key$_K$ is generated from challenge values in Request-Challenge request packet and response packets using the machine key. The server and client communicate as follows. The client first binds to the "Netlogon" RPC service. The client sends a "NetrServerReqChallenge" request to the server. This request is indicated by an "opnum" value of 4. The client challenge is the 8 byte field at offset 0x66 of the RPC data which is appended to the RPC header. The server responds with a server challenge which is the 8 byte field immediately following the RPC header.

The session key$_K$ is generated from these communications as follows. An MD5 hash is generated over a 4 byte buffer of zeros, the 8 byte client challenge, and the 8 byte server challenge. Next, an HMAC_MD5 hash is generated from the saved MD4 hash of the machine password and the MD5 hash from the preceding step. This HMAC_MD5 hash is session key$_K$.

The process then proceeds to block 796, where for each RPC packet, a sealing key is generated from session key$_K$ and the sequence number from the packet header. The sequence number is an 8 byte buffer. The first 4 bytes are a big-endian integer that is incremented by 1 each time that an outgoing verifier in an RPC packet is sent or when an incoming verifier is received. The initial value is 0 on both client and server immediately after the RPC Secure Channel connection is created. The second 4 bytes is {0x80, 0, 0, 0} if the packet is a request, and {0,0,0,0} if the packet is a response. This buffer is passed in the RPC requests and responses in the "Secure Channel Verifier" structure which is appended to the RPC header behind the "auth_verifier_co_t" structure. The structure of the Secure Channel Verifier is: "uchar Signature[8]; uchar SequenceNumber[8]; uchar Digest[8]; uchar Confounder[8];". The sealing key is generated by Xor-ing each byte of the 16 byte session key (from "a" above) with 0xf0. This result is used as the key to hash a 4 byte zero buffer using HMAC_MD5. This result is then used as the key to hash the sequence number buffer using HMAC_MD5. This result is the sealing key.

The process then advances to block 797, where the sealing key is used to decrypt the RPC data using the RC4 algorithm. The process then moves to a return block, where other processing is resumed.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method for decrypting packets sent over a network, comprising:

obtaining, by a network device, an administrator password from a user;

receiving and identifying a packet, by the network device, that is encoded to initiate a secure session of at least two-way network communication;

using, by the network device, the administrator password to decrypt a first session key;

decrypting, by the network device, one or more additional session keys, wherein each additional session key is decrypted using the preceding session key;

receiving, by the network device, a packet that includes a machine key, wherein the packet that includes the machine key is sent from a client to a server;

decrypting, by the network device, the machine key using one of the one or more additional session keys;

using, by the network device, the machine key to decrypt one or more other session keys, using, by the network device, at least one of the one or more other session keys to decrypt one or more additional packets in the secure session; and enabling, by the network device, the decrypted contents of the one or more additional packets to be displayed to the user, wherein enabling the decrypted contents of the one or more additional packets to be displayed to the user comprises:
  decoding, by the network device, at least one field of at least one of the one or more additional packets; and
  enabling, by the network device, the display of a meaning of the decoded field to the user.

2. The method of claim 1, further comprising:
receiving and identifying, by the network device, a packet that contains the first session key, wherein the packet that contains the first session key is sent from the client to the server prior to the packet that is encoded to initiate the secure session, wherein:
  the packet that includes the first session key is a KRB-AS-REP packet;
  the first session key is in the key field of the KRB-AS-REP packet;
  the one or more additional session keys include a second session key and a third session key;
  decrypting the machine key is accomplished using the third session key;
  the packet that is encoded to initiate the secure session is a Session Setup response circuit sent from the server to the client after the server sends the KRB-AS-REP packet and a KRB-TGS-REP packet to the client; and
wherein decrypting the one or more additional session keys includes:
  decrypting, by the network device, the second session key with the first session key, wherein the second session key is in a ticket for a Common Internet File System (CIFS) service in the KRB-TGS-REP packet; and
  decrypting, by the network device, the third session key with the second session key, wherein the third session key is in the subkey field of a KRB-AP-REP structure embedded in a SecurityBlob field of the Session Setup response packet.

3. The method of claim 1, further comprising:
locating, by the network device, the machine key in the packet that includes the machine key, including:
  identifying, by the network device, an opnum in the packet that includes the machine key, wherein the packet that includes the machine key is a Secure Access Module (SAM) Remote Procedure Call (RPC) SetUserinformation2 request packet, the opnum of the SAM RPC SetUserinformation2 request packet has a value of O x3a, and wherein the next 532 bytes after the opnum is the data field of the SAM RPC SetUserinformation2 request packet;
  combining, by the network device, the last 16 bytes of the data field with the third session key in a keyed-hash message authentication code-message digest 5 (HMAC-MD5) hash to generate a decryption key;
  decrypting, by the network device, the first 516 bytes of the data field with the decryption key using the Rivest Cipher 4 (RC4) algorithm;
  evaluating, by the network device, the length of the machine key as the last 4 bytes of the decrypted 516 bytes; and
  locating, by the network device, the machine key as offset 512-L, where L represents the length of the machine key.

4. The method of claim 1, further comprising:
capturing, by the network device, each packet communicated between the client and the server, wherein the network device is booted up before the client and the server are booted up; and
saving, by the network device, each of the packets in a capture file before decrypting the first session key.

5. The method of claim 1, wherein enabling the decrypted contents to be displayed to the user comprises:
  decoding, by the network device, the contents based on the algorithm of the packet; and
  enabling, by the network device, the display of a meaning of the decoded information to the user.

6. The method of claim 1, wherein using the administrator password to decrypt the first session key comprises:
  making, by the network device, a hash of the administrator password; and
  using, by the network device, the hash of the administrator password to decrypt the first session key.

7. The method of claim 1, wherein the first session key, the one or more additional session keys, and the machine key are all decrypted by the network device, and wherein the network device is at a single network endpoint.

8. The method of claim 1, wherein the secure session is a Windows® operating system domain RPC (remote procedure call) encrypted secure session.

9. The method of claim 1, further comprising:
receiving, by the network device, a plurality of packets; and
determining, by the network device, for each of the plurality of packets, whether the packet is encoded to initiate a secure session of at least two-way network communication.

10. The method of claim 9, further comprising:
identifying, by the network device, from among the plurality of packets a packet that contains the first session key, wherein the packet that contains the first session key is sent from the client to the server prior to the packet that is encoded to initiate the secure session, and
wherein determining, by the network device, for each of the plurality of packets, whether the packet is encoded to initiate a secure session of at least two-way network information comprises:
  determining, by the network device, whether a command field of the packet comprises a particular bit pattern indicating that the packet is encoded to initiate a secure session of at least two-way network communication.

11. The method of claim 1, wherein using, by the network device, the machine key to decrypt one or more additional packets in the secure session comprises:
  determining, by the network device, an Remote Procedure Call (RPC) authentication type used for the secure session.

12. The method of claim 11, wherein determining, by the network device, the RPC authentication type used for the secure session comprises:
  when an auth-type field in an auth-verifier-co-t structure of an RPC Bind-ack packet corresponds to a value of 0x09:
    making, by the network device, a determination that the authentication type is Simple and Protected Generic Security Services Application Program Interface Negotiation Mechanism (SPNEGO); and
  when the auth-type field corresponds to a value of 0x68:
    making, by the network device, a determination that the authentication type is Secure Channel.

13. The method of claim 11, wherein
when the RPC authentication type is determined to be Secure Channel:
  using, by the network device, the machine key to decrypt one or more additional packets in the secure session comprises:

generating, by the network device, a message digest 5 (MD5) hash over a buffer, a client challenge, and a server challenge;
generating, by the network device, an MD4 (Message Digest 4) hash of the machine key;
generating, by the network device, a keyed-hash message authentication code-message digest 5 (HMAC-MD5) hash from the MD4 hash of the machine key and the MD5 hash to generate another session key;
generating, by the network device, a sealing key from said another session key and a sequence number in a packet header of the packet being decrypted by the machine key, including:
XORing, by the network device, each byte of said another session key with 0xf0 to obtain an XOR result;
using, by the network device, the XOR result to hash a zero buffer with HMAC-MD5; and
hashing, by the network device, the sequence number using HMAC-MD5 to obtain the sealing key; and
decrypting, by the network device, the packet with the sealing key using the Rivest Cipher 4 (RC4) algorithm.

14. A non-transitory processor-readable medium having processor-executable code stored therein, which when executed by one or more processors, enables actions, comprising:
obtaining, by a network device, an administrator password from a user;
receiving and identifying, by the network device, a packet that is encoded to initiate a secure session of at least two-way network communication;
using, by the network device, the administrator password to decrypt a first session key;
decrypting, by the network device, one or more additional session keys, wherein each additional session key is decrypted using the preceding session key;
receiving, by the network device, a packet that includes a machine key, wherein the packet that includes the machine key sent from a client to a server;
decrypting, by the network device, a machine key using one of the one or more additional session keys;
using, by the network device, the machine key to decrypt one or more other session keys,
using, by the network device, at least one of the one or more session keys to decrypt one or more additional packets in the secure session; and
enabling, by the network device, the decrypted contents of the one or more additional packets decrypted with the machine key to be displayed to the user, wherein enabling the decrypted contents of the one or more additional packets to be displayed to the user comprises:
decoding at least one field of at least one of the one or more additional packets; and
enabling the display of a meaning of the decoded field to the user.

15. A network device for decrypting packets sent over a network, comprising:
a transceiver for receiving and sending information; and
a protocol analyzer that is configured to, in conjunction with the transceiver, enable actions, comprising:
obtaining an administrator password from a user;
receiving and identifying a packet that is encoded to initiate a secure session of at least two-way network communication;
using the administrator password to decrypt a first session key;
decrypting one or more additional session keys, wherein each additional session key is decrypted using the preceding session key;
receiving a packet that includes a machine key, wherein the packet that includes the machine key sent from a client to a server;
decrypting a machine key using one of the one or more additional session keys;
using the machine key to decrypt one or more other session keys,
using at least one of the one or more session keys to decrypt one or more additional packets in the secure session; and
enabling the decrypted contents of the one or more additional packets decrypted with the machine key to be displayed to the user, wherein enabling the decrypted contents of the one or more additional packets to be displayed to the user comprises:
decoding at least one field of at least one of the one or more additional packets; and
enabling the display of a meaning of the decoded field to the user.

16. The network device of claim 15, wherein the protocol analyzer is configured to use the machine key to decrypt the one or more additional packets in the secure session by determining an Remote Procedure Call (RPC) authentication type used for the secure session.

17. The network device of claim 16, wherein the protocol analyzer is configured to determine the RPC authentication type used for the secure session by:
when an auth-type field in an auth-verifier-co-t structure of an RPC Bind-ack packet corresponds to a value of 0x09:
making a determination that the authentication type is Simple and Protected Generic Security Services Application Program Interface Negotiation Mechanism (SPNEGO); and
when the auth-type field corresponds to a value of 0x68:
making a determination that the authentication type is Secure Channel.

18. The network device of claim 16, wherein the protocol analyzer is configured to determine the RPC authentication type used for the secure session such that, when the RPC authentication type is determined to be Secure Channel, the protocol analyzer uses the machine key to decrypt one or more additional packets in the secure session by:
generating a message digest 5 (MD5) hash over a buffer, a client challenge, and a server challenge;
generating a keyed-hash message authentication code-message digest 5(HMAC-MD5) hash from the MD5 hash of the machine key and the hash MD5 hash to generate another session key;
generating a sealing key from said another session key and a sequence number in a packet header of the packet being decrypted by the machine key, including:
XORing each byte of said another session key with 0xf0 to obtain an XOR result;
using the XOR result to hash a zero buffer with HMAC-MD5; and
hashing the sequence number using HMAC-MD5 to obtain the sealing key; and
decrypting the packet with the sealing key using the Rivest Cipher 4 (RC4) algorithm.

* * * * *

UNITED STATES PATENT AND TRADEMARK OFFICE
CERTIFICATE OF CORRECTION

| | | |
|---|---|---|
| PATENT NO. | : 7,904,717 B2 | Page 1 of 1 |
| APPLICATION NO. | : 11/765427 | |
| DATED | : March 8, 2011 | |
| INVENTOR(S) | : L. Mark Pilant et al. | |

It is certified that error appears in the above-identified patent and that said Letters Patent is hereby corrected as shown below:

In Claim 3, Column 11 (line 47), "O x3a" should read as --Ox3a--.

Signed and Sealed this
Twenty-sixth Day of April, 2011

David J. Kappos
*Director of the United States Patent and Trademark Office*